United States Patent Office 2,758,703
Patented Aug. 14, 1956

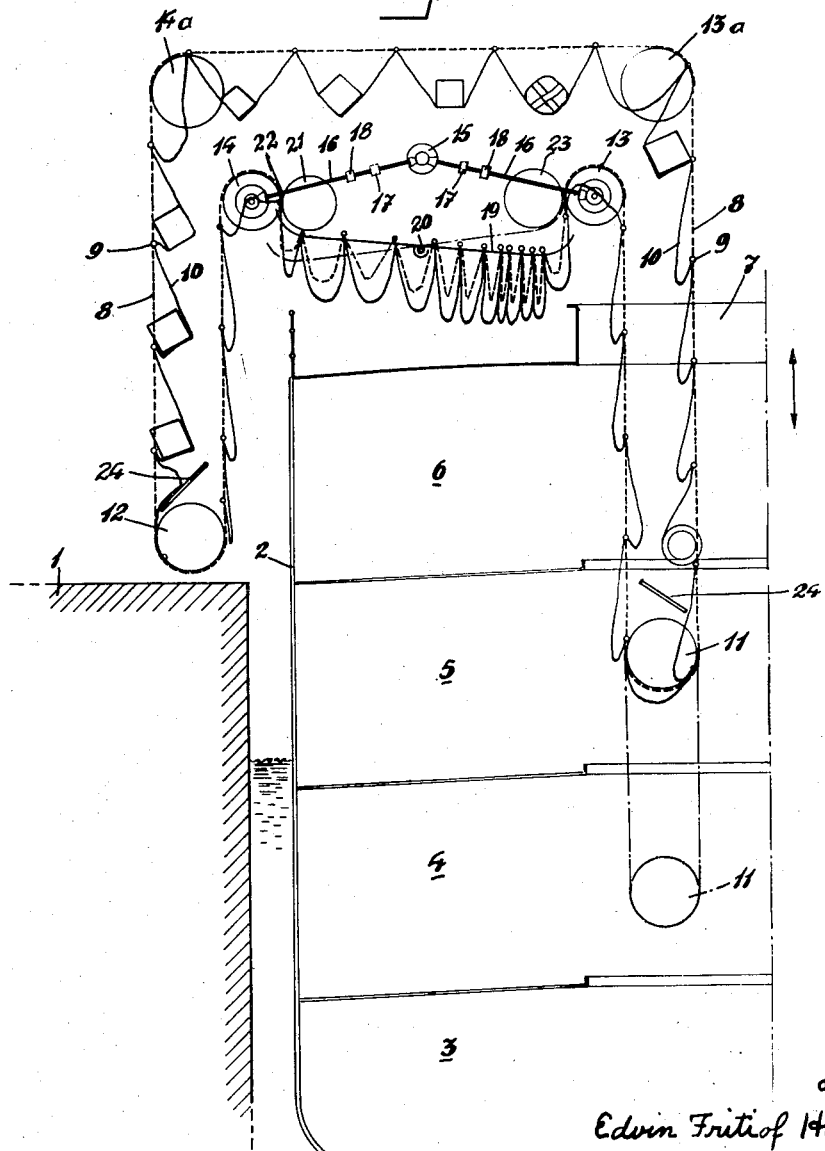

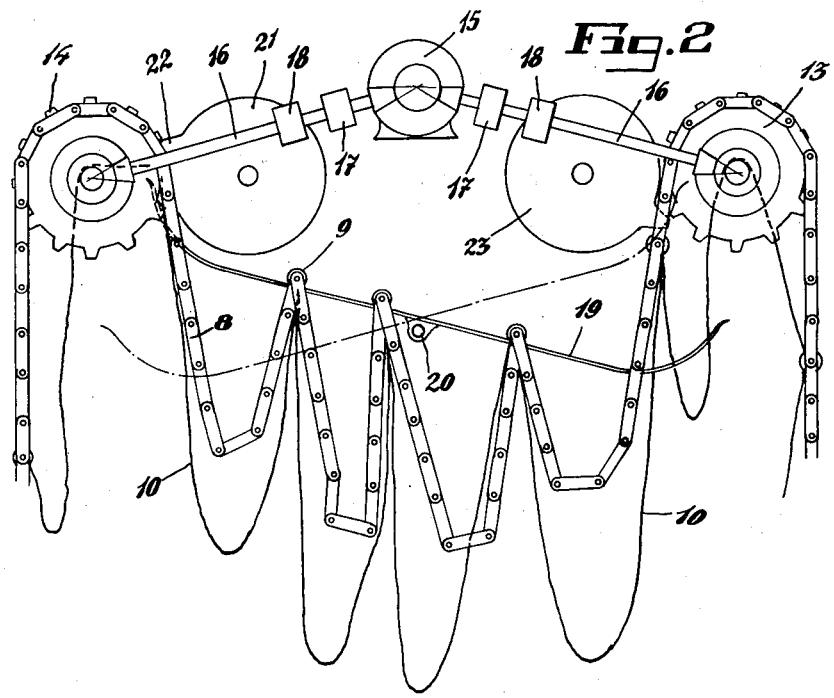
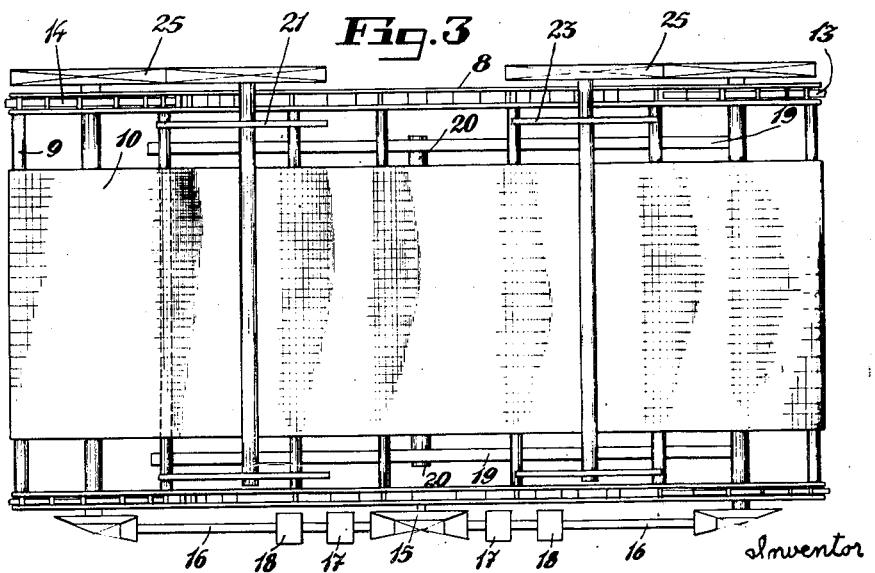

2,758,703

FLEXIBLE POCKET CONVEYING MEANS

Edvin Fritiof Hampf, Goteborg, Sweden, assignor to Aktiebolaget Harbor, Goteborg, Sweden, a corporation of Sweden Application September 23, 1954, Serial No. 457,909

6 Claims. (Cl. 198—153)

The present invention refers to conveying means of the type that preferably comprises two endless chains or the like adapted to support carriers, suspension means or the like for the load. Such conveying means are used, for example, for the unloading of ships, the conveyor then comprising on the one hand a horizontal section and on the other a vertical section intended to be lowered down into the ship's hold. The conveying means of this type as hitherto known were generally constructed so that the vertical section had to be brought down as far as to the lowermost cargo-hold of the ship, for which reason space had to be left for this purpose in all of the cargo-holds.

The present invention refers to a conveyor which during operation can be extended or shortened, as required, and comprises two endless chains or the like, driving means for said chains, carriers or suspension means for a load supported by said chains, projections provided on said chains and collecting means for the part of the chains returning to the point of loading during operation, said collecting means consisting of guides for said projections along which guides said return part of the chains is advanced while hanging in loose loops between said projections.

The accompanying drawings illustrate a form of embodiment of the invention by way of diagrammatic representation. Fig. 1 is a view in elevation of a conveyor constructed in accordance with the invention and taking its working position relatively to a ship lying at a quay. Fig. 2 shows a portion of the conveyor according to Fig. 1 on a larger scale, and Fig. 3 is an upper plan view of the arrangement according to Fig. 2.

In Fig. 1, 1 designates a quay with a ship 2 lying alongside thereof, the cargo-holds of the ship being designated by 3, 4, 5 and 6, respectively. The one vertical section of a conveyor is lowered down through the hold hatch denoted by 7, said conveyor being in known manner made in the form of two chains 8 running in parallel, said chains having rods 9 arranged therebetween and adapted to carry pockets 10, preferably made from fabric and adapted to receive the goods to be transported.

A guide pulley 11 is suspended at the lower end of the conveyor section lowered into the ship, and in a similar manner a guide pulley 12 is arranged at the lower end of the portion of the conveyor located above the quay, which latter guide pulley may, if desired, the suitably anchored in the quay. The return part running between the guide pulleys 11 and 12 is laid over driving wheels 13 and 14, which are driven by an electric motor 15 through the intermediary of transmission means 16 having comprised therein diagrammatically indicated couplings 17, adapted to be loosened, and braking devices 18. The load carrying part of the conveyor runs over guide pulleys 13a and 14a which may be freely rotatable or driven by the motor 15 through transmission means similar to those driving the pulleys 13 and 14.

Arranged between the driving wheels 13 and 14 are two rails 19 paralleling each other, said rails being curved upwardly at the ends thereof while being tiltably mounted on a shaft 20. In the position of the rails 19 shown with full-drawn lines in Figs. 1 and 2, said position corresponding to the unloading of the ship 2, the left ends of the rails, as shown in the figures, project inside the driving wheels 14, so that the rods 9 arranged between the chains 8 will be caught by the rails. Arranged immediately adjacent to the driving wheels 14 are pulleys 21, which are driven synchronously with the driving wheels 14. The pulleys 21 are provided with projections 22 engaging the rods transferred onto the rails 19 and moving the same for a distance inwardly on the rails. As will be seen from the drawings, the chains 8 hang in loose loops from the rods 9 carried by the rails, and are moved by their own weight down toward the right-hand ends of the rails as viewed in the figure, where they are raised by the driving wheels 13. If loading is taking place from the uppermost cargo-hold 6, the guide pulley 11 takes the position shown in Fig. 1. If unloading is to take place from the cargo-hold 5, the guide pulley 11 will have to be lowered down into the position shown by dash lines, which takes place in the following manner.

At first the driving wheels 14 are disconnected with the aid of the coupling 17, the brake 18 being tightened in connection therewith. As the driving wheels 13 are still running, the chains will be pulled from the rails 19, where as the remainder of the conveyor is standing still. Hereby the guide pulley will be lowered, and when the desired depth has been reached, the wheels 14 are started anew.

If the guide pulley 11 is to be raised, the driving wheels 13 are disconnected and braked, the chains being then fed onto the rails 19 by the driving wheels 14.

By the arrangement shown, it is also possible to extend the conveyor, without the same having to be stopped. This is effected by the wheel 13 being disconnected, whereby the chains will be pulled off the rails 19 by their own weight, the rate of lowering of the guide pulley 11 then permitting of being controlled by means of the braking device 18 associated with the wheel 13.

For convenience, the couplings 17 and the braking devices 18 are shown in the drawings as being inserted into the transmission means 16, which obviously need not be constructed in the manner shown, but may be arranged in any arbitrary and suitable manner. In practice, however, it is most frequently believed to be the most suitable to locate the couplings as well as the braking devices at the driving wheels 13 and 14, respectively, it being then possible to make use of a common operating means for the two elements, so that the braking is effected, for instance, at a displacement of the operating member past the position in which the coupling is disconnected.

The conveyor shown in the drawings is reversible, the rails 19 being consequently tiltable and permitting of being swung over into the position shown by chain-dotted lines. Therefore, the wheels 13 are also associated with pulleys 23 corresponding to the pulleys 21, and emptying means in the form of inclined plates 24 or the like are provided both above the guide pulley 11 and above the guide pulley 12, said plates conveying the load out of the pockets 10.

In Fig. 3, 25 designates toothed gearings for the synchronization of the pulleys 21 and 23 with the driving wheels 14 and 13.

Through the arrangement described, facilities are provided for extending and shortening the conveyor in a simple manner, and the means may be constructed in a very compact manner calling for little space only. It should be understood that the invention is also applicable in other types of conveyors, for instance in devices where cables are used instead of chains. Also, it is not necessary that the conveyor be broken in the manner shown in the constructive example, the same can also be made straight. It is also possible to apply the invention in conveyors consisting of a single endless chain, wherein certain links are provided with projections or the like adapted for cooperation with the guides, which latter construction is obviously also serviceable in conveyors having two or more chains, if the latter are not mutually connected by means of rods or the like in the manner shown in the drawings. Other modifications are also conceivable within the scope of the appended claims.

What I claim is:

1. A conveyor comprising two endless chains or the like, driving means for said chains, carriers or suspension means for a load supported by said chains, projections provided on said chains, collecting means for the part of the chains returning to the point of loading during operation adapted for shortening or lengthening of the conveying distance, said collecting means consisting of downwardly inclined guides for said projections along which guides said return part of the chains is advanced while hanging in loose loops between said projections, and means for removing the chains from said guides, said means being provided at the discharge end of the guides and being driven synchronously with the driving means of the chains.

2. A conveyor comprising two endless chains, driving means for said chains, rods mutually connecting said chains, load supporting means supported by said rods, collecting means for the part of the chains returning to the point of loading during operation adapted for shortening or lengthening of the conveying distance, said collecting means consisting of downwardly inclined guides cooperating with said rods for the advancement of the chains in loosely hanging loops on said guides, and means for removing the chains from the guides, said means being provided at the discharge end of the guides and being driven synchronously with the driving means of the chains.

3. A conveyor as defined in claim 2 including means for transferring said rods to the guides, said means being arranged at the feeding-in end of the guides and being driven synchronously with the driving means of the chains.

4. A conveyor as defined in claim 3 wherein said means for transferring the rods to said guides consists of a guide pulley having a projection thereon to catch said rods of the return part of the conveyor and place them on said guides, and a feeding device for moving the rods caught by said projection a certain distance on said guides.

5. A conveyor as defined in claim 1 wherein said guides are pivotally mounted on a shaft for the adjustment of the inclination of the guides.

6. A variable length conveyor for loading and unloading apparatus comprising two endless chains, driving means for said chains, rods mutually connecting said chains, load supporting means supported by said rods, and means for collecting the slack portions of the chains returning to the point of loading operation, said collecting means consisting of horizontally spaced driving wheels and downwardly inclined guide rails pivotally secured beneath and extending generally between said driving wheels, said guide rails being swingably adapted to cooperate with either of said driving wheels to allow reversible operation of the apparatus, said rods being supported by said guide rails with said chains hanging in loose loops therebetween, said rods advancing by gravity down the guide rails, and means for transferring said rods onto the guide rails, said transferring means consisting of a guide pulley adjacent the driving wheel cooperating with the guide rails and having a projection on the periphery thereof, and said other driving wheel being driven synchronously with said first driving wheel to remove said chains from the lower portions of said guide rails.

References Cited in the file of this patent

UNITED STATES PATENTS

| | | |
|---|---|---|
| 1,044,301 | Tucker | Nov. 12, 1912 |
| 1,112,440 | Donald et al. | Oct. 6, 1914 |

FOREIGN PATENTS

| | | |
|---|---|---|
| 371,679 | Italy | June 1, 1939 |